United States Patent [19]
Tohda et al.

[11] Patent Number: 5,679,888
[45] Date of Patent: Oct. 21, 1997

[54] DYNAMIC QUANTITY SENSOR AND METHOD FOR PRODUCING THE SAME, DISTORTION RESISTANCE ELEMENT AND METHOD FOR PRODUCING THE SAME, AND ANGULAR VELOCITY SENSOR

[75] Inventors: Takao Tohda, Ikoma; Hiroyuki Kado, Osaka; Ichiro Tanahashi, Hirakata; Yoshio Manabe; Masaru Yoshida, both of Katano, all of Japan

[73] Assignee: Matsushita Electric Industrial Co., Ltd., Kadoma, Japan

[21] Appl. No.: 538,577

[22] Filed: Oct. 3, 1995

[30] Foreign Application Priority Data

| Oct. 5, 1994 | [JP] | Japan | 6-241219 |
| Apr. 17, 1995 | [JP] | Japan | 7-090999 |
| Apr. 28, 1995 | [JP] | Japan | 7-105546 |

[51] Int. Cl.$^6$ ............................ G01D 5/06; G01B 7/34
[52] U.S. Cl. ............................................ 73/105; 250/306
[58] Field of Search ................................ 73/105; 250/306, 250/307

[56] References Cited

U.S. PATENT DOCUMENTS

| 4,674,320 | 6/1987 | Hirschfeld | 73/31.03 X |
| 5,094,975 | 3/1992 | Siu | 437/89 |
| 5,307,311 | 4/1994 | Sliwo, Jr. | 365/174 |
| 5,387,462 | 2/1995 | Debe | 428/245 |

FOREIGN PATENT DOCUMENTS

| 5142605 | 6/1993 | Japan. |
| 5264282 | 10/1993 | Japan. |
| 5333038 | 12/1993 | Japan. |

OTHER PUBLICATIONS

*Patent Abstracts of Japan*: "Ultrasonic Wave Energy" (59–57595) Abs Pub Date Jul. 19, 1984 Grp E256, vol. 8, No. 155.
*Patent Abstracts of Japan*: "ImmunoAssay" (3–2566) Abs Pub Date Mar. 14, 1991 Grp P1179, vol. 15, No. 107.
*Patent Abstracts of Japan*: "Manufacture of Thin Film Semiconductor Resistance Device" (4–164373) Abs Pub Date Sep. 28, 1993 Grp E1270, vol. 16, No. 465.
*Patent Abstracts of Japan*: "Temperature Coefficient Organic Positive Characteristics Thermistor" (5–198404) Abs Pub Date Nov. 18, 1993 Grp E1461, vol. 17, No. 625.
Keck et al, Review of Scientific Instruments, vol. 60, No. 2, pp. 165–180, "Scanning Tunneling Microscope Instrumentation," Feb. 1989.
Tanahashi et al, J. Mater. Res., vol. 10, No. 2, pp. 362–365, Feb. 1995, "Effects of Heat Treatment on Ag Particle Growth and Optical . . .".

Primary Examiner—Thomas P. Noland
Attorney, Agent, or Firm—Renner, Otto, Boisselle & Sklar

[57] ABSTRACT

The dynamic quantity sensor includes an electrically insulating substance layer and at least one pair of electrodes contacting the electrically insulating substance layer, wherein a plurality of conductive particles are dispersed in the electrically insulating substance layer so that a tunnel current flows when a voltage is applied between the at least one pair of electrodes, and a dynamic quantity relating to a distance between the conductive particles is detected based on the tunnel current.

19 Claims, 9 Drawing Sheets

DYNAMIC QUANTITY SENSOR AND METHOD FOR PRODUCING THE SAME, DISTORTION RESISTANCE ELEMENT AND METHOD FOR PRODUCING THE SAME, AND ANGULAR VELOCITY SENSOR

BACKGROUND OF THE INVENTION

1. Field of the Invention

The present invention relates to a dynamic quantity sensor capable of detecting the dynamic quantity of distortion, attraction, repulsion, vibration, temperature, and the like at high sensitivity based on a change in the electrical resistance of a distortion resistance layer. More specifically, the present invention relates to a distortion resistance element and a method for producing the same, a cantilever and a method for producing the same, and an angular velocity sensor.

2. Description of the Related Art

Elements including a distortion resistance layer have been conventionally used for converting a dynamic quantity of distortion, attraction, repulsion, vibration, temperature, and the like into an electric signal. One of such distortion resistance elements is an element having a striped metal thin film formed on a substrate, which detects a change in the electrical resistance of the metal thin film caused in accordance with the deformation of the element due to an external force. Another element detects a change in the electrical resistance of a semiconductor, such as silicon, of which resistance has been reduced by doping caused by distortion. Such distortion resistance elements are widely used as, not only a distortion sensor, but also an acceleration sensor, a pressure sensor, a shock sensor, and an infrared sensor.

The distortion resistance element including a metal thin film, which is produced by a film formation process such as vapor deposition, is advantageous in that it can be directly formed on an object of which distortion is to be measured and that the change in the resistance depending on the temperature is small. It is disadvantageous, however, in that the change in the resistance depending on the distortion is small, i.e., the sensitivity is low.

The element including a semiconductor, such as silicon, has high sensitivity, but the resistance largely changes depending on the temperature.

SUMMARY OF THE INVENTION

The dynamic quantity sensor of this invention includes an electrically insulating substance layer and at least one pair of electrodes in contact with the electrically insulating substance layer, wherein a plurality of conductive particles are dispersed in the electrically insulating substance layer so that a tunnel current flows when a voltage is applied between the at least one pair of electrodes, and a dynamic quantity relating to a distance between the conductive particles is detected based on the tunnel current.

In one embodiment of the invention, the dynamic quantity sensor further includes a base for supporting the electrically insulating substance layer.

In another embodiment of the invention, the base is a flat substrate.

In still another embodiment of the invention, the base is a beam in which both ends are fixed.

In still another embodiment of the invention, the base is a cantilever in which one end is fixed.

In still another embodiment of the invention, the diameter of the conductive particles is in the range of 1 to 50 nm.

In still another embodiment of the invention, the conductive particles are dispersed in layers in the electrically insulating substance layer.

In still another embodiment of the invention, the distance between the conductive particles is 5 nm or less.

In still another embodiment of the invention, the conductive particles ere made of at least one metal selected from the group consisting of aluminum (Al), chrome (Cr), manganese (Mn), iron (Fe), cobalt (Co), nickel (Ni), copper (Cu), zinc (Zn), gallium (Ga), palladium (Pd), silver (Ag), indium (In), tin (Sn), platinum (Pt), gold (Au), and lead (Pb).

In still another embodiment of the invention, the electrically insulating substance layer is made of an oxide, and the conductive particles are made of at least one metal selected from the group consisting of gold (Au), silver (Ag), copper (Cu), platinum (Pt), and palladium (Pd).

In still another embodiment of the invention, the electrically insulating substance layer is made of as a main component at least one material selected from the group consisting of oxides of silicon (Si), aluminum (Al), titanium (Ti), and hafnium (Hf) and nitrides of silicon (Si) and aluminum (Al).

According to another aspect of the invention, a distortion resistance element is provided, which includes an electrically insulating substance layer and at least one pair of electrodes contacting the electrically insulating substance layer, for detecting a distortion arising in the electrically insulating substance layer based on a current flowing between the pair of electrodes, wherein a plurality of conductive particles are dispersed in the electrically insulating substance layer so that a tunnel current flows when a voltage is applied to the at least one pair of electrodes.

In still another embodiment of the invention, the electrically insulating substance layer and the pair of electrodes are formed as a plurality of stacked layers.

According to still another aspect of the invention, a method for producing a distortion resistance element is provided, which includes the steps of: forming an electrically insulating substance layer having conductive particles dispersed therein; and forming at least one pair of electrodes on the electrically insulating substance layer, wherein the step of forming the electrically insulating substance layer includes the step of depositing the electrically insulating substance and the conductive particles alternately.

Alternatively, the method for producing a distortion resistance element includes the steps of: forming an electrically insulating substance layer having conductive particles dispersed therein; and forming at least one pair of electrodes on the electrically insulating substance layer, wherein the method further comprises the step of heat-treating the electrically insulating substance layer having the conductive particles dispersed therein so as to control the size of the conductive particles.

According to still another aspect of the invention, a method for producing a dynamic quantity sensor is provided, which includes the steps of: forming a resistance layer including an electrically insulating substance layer having conductive particles dispersed therein on a substrate; etching a portion of the resistance layer so as to have a shape of a beam; forming at least one pair of electrodes on the beam-shaped resistance layer; and removing at least a portion of the substrate located below the beam-shaped resistance layer.

Alternatively, the method for producing a dynamic quantity sensor includes the steps of: forming a beam; forming a thin film including at least a resistance layer including an electrically insulating substance layer having conductive particles dispersed therein on the beam; and forming at least one pair of electrodes on the resistance layer.

In one embodiment of the invention, the step of forming a resistance layer includes the step of depositing the electrically insulating substance and the conductive particles alternately.

In another embodiment of the invention, the method further includes the step of heat-treating the resistance layer.

According to still another aspect of the invention, an angular velocity sensor is provided, which includes a cantilever extending in a first direction; driving means for vibrating the cantilever; a plurality of distortion resistance elements disposed on a main plane of the cantilever; and detection means for detecting resistances of the plurality of distortion resistance elements, wherein the plurality of distortion resistance elements extend in different directions inclined by a same predetermined angle from the first direction.

In one embodiment of the invention, the driving means includes a piezoelectric element disposed on a fixed portion of the cantilever and a driving circuit for applying a voltage to the piezoelectric element.

In another embodiment of the invention, the fixed portion of the cantilever is composed of a silicon substrate, and at least one of the driving circuit for driving the driving means and the detection means is formed on the silicon substrate.

In still another embodiment of the invention, a portion of the cantilever where the distortion resistance elements are formed is narrower than a free end of the cantilever.

In still another embodiment of the invention, a portion of the cantilever where the distortion resistance elements are formed is thinner than a free end of the cantilever.

In still another embodiment of the invention, each of the distortion resistance elements includes a semiconductor diffusion resistance layer.

In still another embodiment of the invention, each of the distortion resistance elements includes a thin film metal resistance layer.

In still another embodiment of the invention, the detection means includes a Wheatstone bridge circuit.

In still another embodiment of the invention, a resistor of the Wheatstone bridge circuit is made of the same material as that for the distortion resistance elements and disposed on a fixed portion of the cantilever.

In still another embodiment of the invention, each of the distortion resistance elements includes an electrically insulating substance layer and at least one pair of electrodes contacting the electrically insulating substance layer, and a plurality of conductive particles are dispersed in the electrically insulating substance so that a tunnel current flows when a voltage is applied between the at least one pair of electrodes.

Thus, the invention described herein makes possible the advantages of (1) providing a dynamic quantity sensor, such as a distortion resistance element, which is excellent in stability and reliability, (2) providing a method for producing such a dynamic quantity sensor, and (3) providing a small, light, and inexpensive angular velocity sensor with high sensitivity.

These and other advantages of the present invention will become apparent to those skilled in the art upon reading and understanding the following detailed description with reference to the accompanying figures.

DESCRIPTION OF THE PREFERRED EMBODIMENTS

Figure 1A:
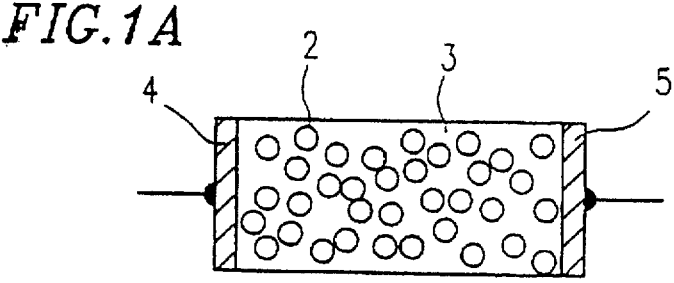
FIGS. 1A and 1B are schematic sectional views showing distortion resistance elements according to the present invention.
Figure 1B:
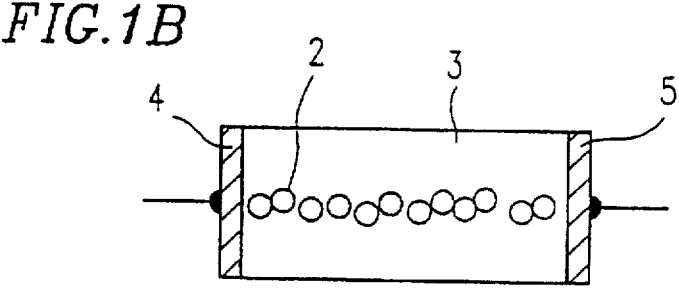

First, referring to FIGS. 1A and 1B, distortion resistance elements used for a dynamic quantity sensor according to the present invention will be described. The "dynamic quantity" as used herein refers to a "physical quantity affecting the distance between adjacent conductive particles dispersed in an electrically insulating substance layer", which includes distortion, attraction, vibration, and temperature. FIGS. 1A and 1B schematically show cross sections of distortion resistance elements according to the present invention. In the distortion resistance element shown in FIG. 1A, conductive particles 2 are dispersed substantially uniformly along the depth of an electrically insulating substance layer 3. On the other hand, in the distortion resistance element shown in FIG. 1B, conductive particles 2 are present only in a specific depth range of an electrically insulating substance layer 3 forming a layer of the conductive particles 2 therein.

In such distortion resistance elements according to the present invention, when a voltage V is applied between a pair of electrodes 4 and 5 disposed in contact with the electrically insulating substance layer 3, electrons pass through gaps between the conductive particles dispersed in the electrically insulating substance layer 3 so as to allow a so-called tunnel current to flow through. A study on the tunnel current is reported, for example, in Rev. Sci. Instrum. 60(2) 165, 1989.

According to the present invention, a tunnel current I represented by the following expression flows through the electrically insulating substance layer.

$$I = k(V/d) \exp(-A\phi^{1/2}d)$$

where k is a constant, d is the distance between the conductive particles (Å), $A=1.025(eV)^{-1/2}Å^{-1}$, and $\phi$ is the barrier height between the conductive particles (eV).

It is observed from the above expression that the resistance between the conductive particles greatly depends on the distance d between the conductive particles. This makes it possible to detect distortion at high sensitivity. Resistance does not directly depend on the temperature, though the distance between the conductive particles changes depending on thermal expansion. The inventors of the present invention have found that this principle can be used to realize a distortion resistance element which has high sensitivity to distortion and excellent temperature characteristics and can operate for a long period of time with high stability and reliability.

Now, the distortion resistance element of FIG. 1A of the present invention will be described. The distortion resistance element includes the electrically insulating substance, layer 3 formed on a substrate not shown and the pair of electrodes 4 and 5 disposed in contact with the electrically insulating substance layer 3. The conductive particles 2 are dispersed in the electrically insulating substance layer 3 so as to allow a tunnel current to flow therebetween when a voltage is applied between the pair of electrodes 4 and 5. The volumetric occupation of the conductive particles in the electrically insulating substance layer is 15 to 70% when the conductive particles are dispersed so as to allow a tunnel current to flow therebetween.

The substrate may be made of glass, metal, resins, and other various materials according to the usage of the resultant element. When the substrate is made of a conductive material such as metal, it can be used as one of the pair of electrodes. In such a case, the tunnel current flows in the vertical direction as is viewed from FIG. 1A. The substrate is not necessarily a flat plate, and indeed a substrate of other shapes may be used. Alternatively, the electrically insulating substance layer 3 and the pair of electrodes 4 and 5 may be directly formed on an object of which distortion is to be measured.

The conductive particles 2 may be made of any conductive material. Preferably, they are made of a material which is thermally and chemically stable, especially, for example, a precious metal. The diameter of the conductive particles 2 is preferably 1 to 50 nm. Conductive particles of this size range can be dispersed in the electrically insulating substance layer 3 comparatively uniformly while keeping the distance between the particles at the nanometer level. Especially, it has been found by the inventors that, when the conductive particles are grown by sputtering to have a diameter of 1 to 50 nm, the distance between the conductive particles becomes appropriate for the flow of the tunnel current. Most important is that the distance between the particles should be in an appropriate range, e.g., from more than 0 to 5 nm, to allow the tunnel current to flow therebetween. Accordingly, conductive particles with a diameter of more than 50 nm can be dispersed and allow the tunnel current to flow therebetween as far as the density of the conductive particles in the electrically insulating substance layer is appropriately adjusted. Naturally, all of the particles do not have to be apart from any adjacent particles by a certain distance to allow the tunnel current to flow therebetween. There arises no problem if some particles are short-circuited with other particles. In short, it is enough to have a portion somewhere between the pair of electrodes where no current except for the tunnel current will flow therethrough. A particularly sensitive distortion resistance element was obtained when the volumetric occupation of the conductive particles 2 in the portion of the electrically insulating substance layer 3 where the current actually flows was in the range of 15 to 70%. This will be described later in detail.

Next, the distortion resistance element shown in FIG. 1B will be described. Since the conductive particles are dispersed to form a layer in the electrically insulating substance layer, a comparatively small quantity of a conductive material is enough for forming the required quantity of particles. The process of forming the conductive particles is especially easy when it is conducted by sputtering. The element of FIG. 1B has an anisotropic sensitivity where the sensitivity to a distortion on a plane of the electrically insulating substance layer 3 is higher than that to a distortion along the depth (thickness) thereof. This is because the tunnel current changes little in the magnitude or does not flow at all for some distortions along the depth of the electrically insulating substance layer 3. In FIG. 1B, the conductive particles are shown to have been dispersed to form one layer. The same effect can also be obtained when the conductive particles are dispersed to form a plurality of layers. By dispersing the conductive particles to form a layer or layers in the electrically insulating substance layer, it is possible to confine a portion of the particles where a current flows therethrough within the electrically insulating substance, thereby preventing the electrical characteristics of the element from being degraded due to an atmospheric gas. Thus, even when the conductive particles are made of a material which easily reacts with an atmospheric gas, the resultant element is highly reliable.

Figure 2A:
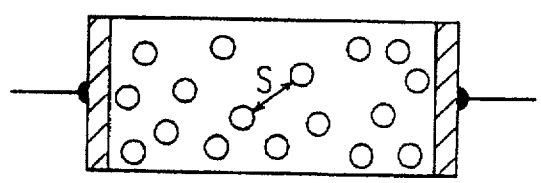
FIGS. 2A to 2C are plan views showing the dispersion of conductive particles in an electrically insulating substance layer according to the present invention.
Figure 2B:
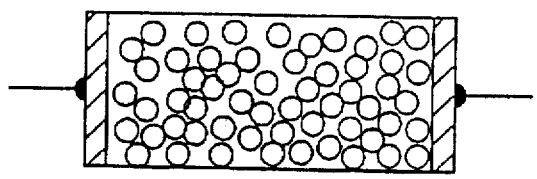
Figure 2C:
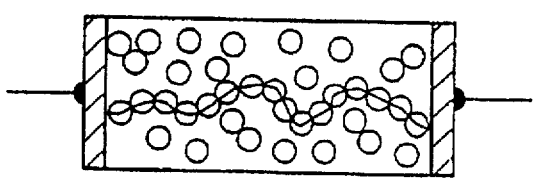

FIGS. 2A to 2C are schematic plan views showing the dispersion of conductive particles between a pair of electrodes. In FIG. 2A, a space S between the conductive particles is too large to allow a tunnel current to flow therethrough. In FIG. 2B, the space S between the particles is so small that a current path is formed by directly contacted particles, and thus a tunnel current is substantially prevented from flowing. In FIG. 2C, a space suitable for the flow of the tunnel current exists in at least a portion of the current path, allowing the tunnel current to flow therethrough, and thus the magnitude of a distortion can be detected by measuring the tunnel current.

The electrically insulating substance layer 3 may be made of a material having a conductivity low enough to allow a change in the tunnel current to be detected, such as oxides, nitrides, and organic materials. The electrodes 4 and 5 are formed so that they are ensured to be electrically connected with the conductive particles 2. For example, when the conductive particles 2 are formed in layers in a specific depth range in the electrically insulating substance layer 3, at least a portion of the surface of the electrically insulating substance layer 3 should be removed so that the electrodes 4 and 5 can be electrically in contact with some of the conductive particles 2 dispersed in layers. The electrically insulating substance layer 3 is preferably made of a substance having as a main component at least one material selected from the group consisting of oxides of silicon (Si), aluminum (Al), titanium (Ti), and hafnium (Hf), and nitrides of silicon (Si) and aluminum (Al). By using such a substance, an element which can operate stably even in a corrosive gas atmosphere and/or a high-temperature atmosphere is realized.

A stable electrical connection between the conductive particulates and the electrodes is ensured by forming in layers the electrodes and the composite layer composed of the electrically insulating substance having the conductive particles dispersed therein on an electrical insulating substrate. Thus, an element with high reliability can be produced. When the conductive particles are formed to have a diameter in the range of 1 to 50 nm, the distance between the particles can be easily controlled so as to allow the tunnel current to flow stably therebetween, and as a result the element can be produced with good reproducibility. In particular, when the distance between the conductive particles is 5 nm or less, the change rate of the resistance depending on the distortion can be increased. Further, when the conductive particles are rounded, the areas of the surfaces of the conductive particles which the tunnel current flows along can be kept stable for a long period of time. This provides a distortion resistance element with high stability without initial variation nor drifting in resistance. Conductive particles having a diameter of 1 to 50 nm were produced with good reproducibility by using at least one metal selected from the group consisting of aluminum (Al), chrome (Cr), manganese (Mn), iron (Fe), cobalt (Co), nickel (Ni), copper (Cu), zinc (Zn), gallium (Ga), palladium (Pd), silver (Ag), indium (In), tin (Sn), platinum (Pt), gold (Au), and lead (Pb). In particular, when the electrically insulating substance layer is made of an oxide, the particles are preferably made of at least one of the precious metals such as gold, silver, copper, platinum, and palladium, so that the reaction of the conductive particles with the electrically insulating substance can be prevented and thus the change of the electrical characteristics of the element with time can be suppressed.

The composite material having the conductive particles dispersed in the electrically insulating substance layer at a desired density can be easily formed with good reproducibility by depositing the electrically insulating substance and the conductive particles alternately or simultaneously on a substrate. Conductive particles formed by sputtering a metal material are comparatively uniform in the diameter, so that the electrical characteristics of the element can be controlled with good reproducibility. An electrically insulating substance layer formed by sputtering is solid and excellent in insulation, so that a stable and reliable element can be produced.

The composite material with the conductive particles dispersed therein may be heat-treated so as to change the size and shape of the conductive particles and improve the crystallinity thereof. This makes it possible to control the distance between the particles and the density of the particles, and thereby to produce an element with desired excellent characteristics.

(EXAMPLE 1)

An example of the distortion resistance element according to the present invention will be described in detail with reference to FIGS. 3 and 4.

Figure 3:
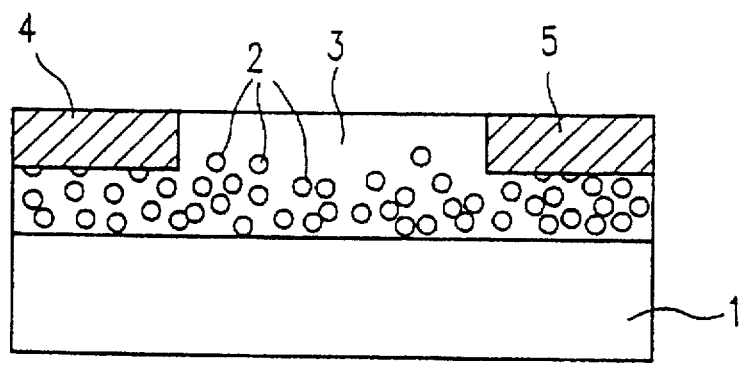
FIG. 3 is a sectional view of an example of the distortion resistance element according to the present invention.

Referring to FIG. 3, the distortion resistance element of Example 1 includes a silica glass substrate 1, en electrically insulating substance layer 3 (thickness: 0.04–2.0 μm) supported on the substrate 1, and a pair of electrodes 4 and 5 (thickness: about 0.1 μm) in contact with the electrically insulating substance layer 3. In this example, the size of the silica glass substrate 1 is 3 mm in length, 5 mm in width, and 0.2 mm in thickness. A plurality of conductive particles 2 are dispersed in the electrically insulating substance layer 3 so that a tunnel current can flow therebetween when a voltage is applied between the pair of electrodes 4 and 5. As a result, the electrically insulating substance layer 3 having the conductive particles 2 dispersed therein works as a "distortion resistor" or a "distortion resistance layer". In this example, the electrically insulating substance layer 3 is made of $SiO_2$, and the conductive particles are made of gold (Au).

Figure 4:
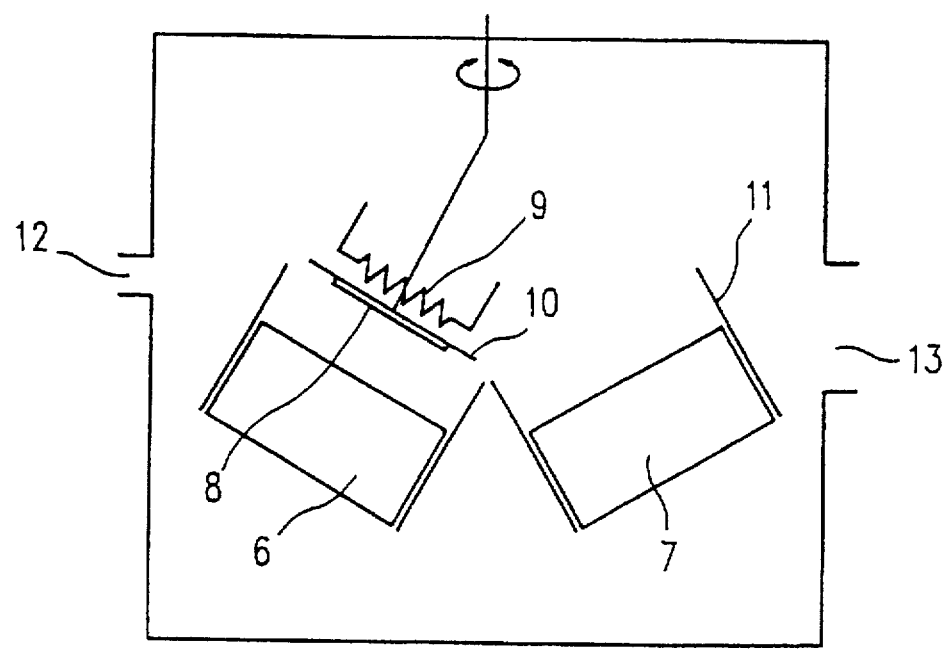
FIG. 4 is a schematic view of a sputtering apparatus used for the production of the distortion resistance element of FIG. 3.

In Example 1, the distortion resistance layer was formed using a sputtering apparatus as shown in FIG. 4. A silica ($SiO_2$) glass target 6 and a gold (Au) target 7 were used as sputtering targets. A substrate 8 (corresponding to the substrate 1 in FIG. 3) was fixed to a substrate holder 10 provided with a heater 9. The substrate 8 can be placed above the $SiO_2$ target 6 or the Au target 7 by rotating the axis coupled to the substrate holder 10. The position of the substrate 8 above each of the targets 6 and 7 and the duration when the substrate 8 stays at each position are controlled by a computer. Each of the targets 6 and 7 are surrounded by a shield 11 so as to prevent the substrate and layers to be formed from being contaminated during the sputtering. A silica glass with a mirror-finished surface having a thickness of 0.2 mm was used as the substrate 8. Argon or an argon gas containing oxygen was used as a sputtering gas, which was introduced into the apparatus through an inlet 12. An output 13 was connected to a vacuum exhaust system, and the gas pressure was set at 1.0 Pa. The temperature of the substrate was set at 200° C., and the applied power to the $SiO_2$ target 6 and the Au target 7 were 250 W and 30 W, respectively.

First, the substrate 8 was allowed to remain above the Au target 7 for 200 seconds so as to have Au particles deposited thereon in an argon gas. Then, the substrate 8 was rotated to stay above the $SiO_2$ target 6 for five minutes so as to have $SiO_2$ deposited thereon in an argon gas containing 10% oxygen to form a $SiO_2$ film. Thus, the distortion resistance layer (the electrically insulating substance layer 3 having the conductive particles 2 dispersed therein) was formed. The temperature of the substrate holder 10 was kept in the range from room temperature to 200° C. The resultant $SiO_2$ film with Au particles dispersed therein was observed in section by a transmission electronic microscope (TEM). The average diameter of the Au particles was 5 nm. The diameter of the Au particles is greater as the duration when the substrate 8 remains above the Au target 7 lengthens. When the duration exceeds 600 seconds, for example, the Au particles join adjacent Au particles, forming a porous Au film. Accordingly, in order to form the distortion resistance layer used for the present invention, the sputtering conditions must be adjusted so that the diameter of the Au particles does not exceed 50 nm.

Thereafter, the pair of electrodes 4 and 5 were formed on the thus-formed distortion resistance layer by vapor deposition. More specifically, before the formation of the electrodes, the portions of the $SiO_2$ film where the electrodes were to be formed were etched away to a thickness of about 0.1 μm by use of a hydrofluoric acid. Then, chrome (Cr) was vapor-deposited to a thickness of 50 nm and then Au was vapor-deposited to a thickness of 0.1 μm so as to form the electrodes 4 and 5. The width of each electrode was 3 mm, and the distance between the electrodes was 0.5 mm. Thus, the distortion resistance element shown in FIG. 3 was completed.

Figure 5A:
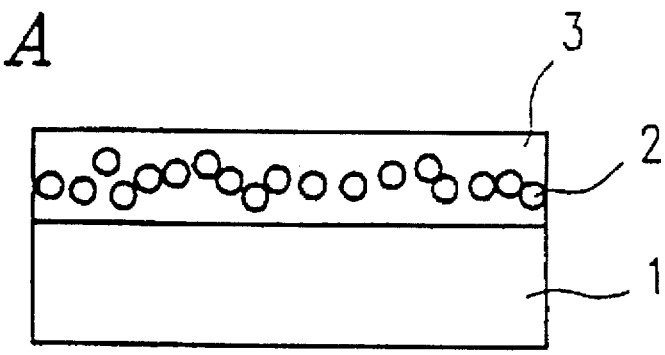
FIGS. 5A to 5C are sectional views showing steps of an electrode formation method according to the present invention.
Figure 5B:
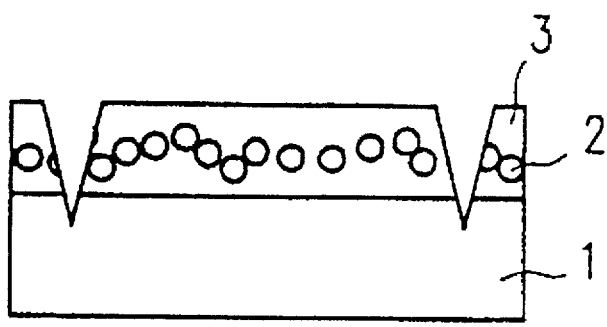
Figure 5C:
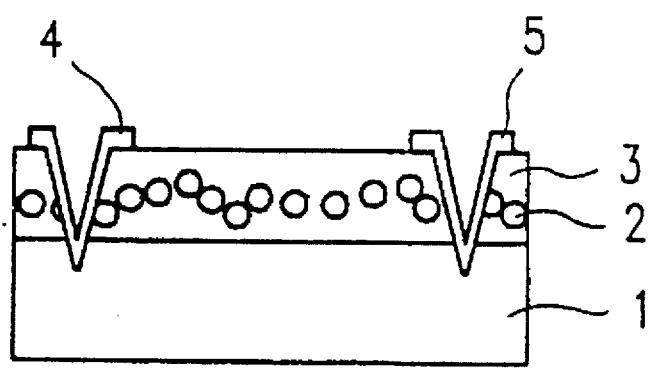

Another electrode formation method will be described with reference to FIGS. 5A to 5C. First, as shown in FIG. 5A, the distortion resistance layer is formed on the substrate 1 in the manner described above. Then, as shown in FIG. 5B, a pair of V-shaped grooves are formed through the distortion resistance layer so as to reach the substrate 1. Thereafter, as shown in FIG. 5C, the electrodes 4 and 5 are formed in the V-shaped grooves. The V-shaped grooves effectively increase the areas of the electrodes which are electrically in contact with the conductive particles. This ensures stable contact between the electrodes and the conductive particles. This formation of the V-shaped electrodes is particularly effective when the conductive particles are dispersed to form layers.

Figure 6:
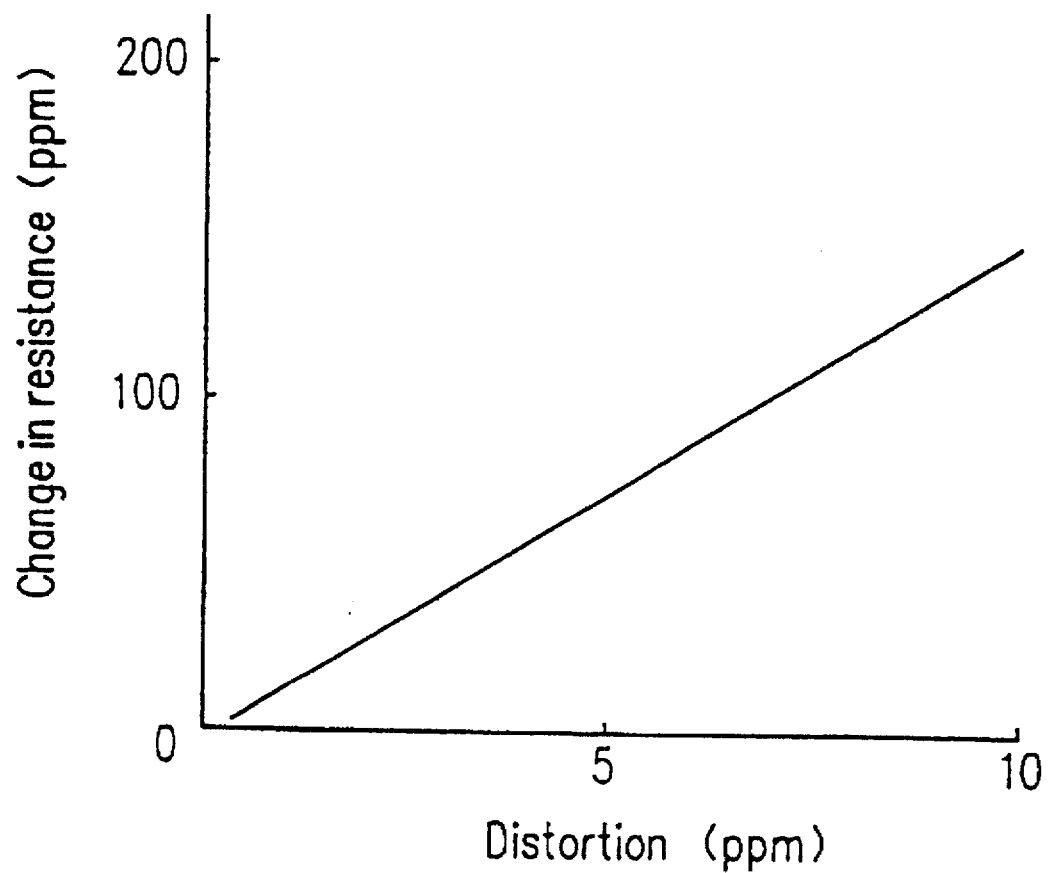
FIG. 6 is a graph showing the relationship between the distortion and the change in the resistance set for the distortion resistance element according to the present invention.

FIG. 6 shows the relationship between the distortion and the resistance measured by the distortion resistance element. It is observed from FIG. 6 that the resistance change rate (gauge factor) for a unit distortion is 15. This proves that the distortion resistance element of this example is nearly 10 times as sensitive as the conventional element using a metal thin film. The distortion resistance element of the present invention can provide a gauge factor of 5 to 80. It is also found that the distortion resistance element of the present invention has an excellent temperature-resistance characteristic of 10 ppm/°C. in the temperature range of −40° C. to 200° C. In FIG. 6, the change in the electric resistance between the electrodes due to distortion is shown. However, it has been found that the magnitude of the distortion can also be detected by detecting a change in the capacitance.

In the above example, the distortion resistance layer was produced by the one-time sputtering of each of the metal target and the insulator target. Alternatively, a distortion resistance layer can be produced by repeating about 300 times the process where the substrate 8 is, for example, located above the metal target for 5 seconds and then above the insulator target for 10 seconds. The resultant distortion resistance layer has layers of conductive particles with uniform diameters and can provide a precise resistance.

Alternatively, the substrate 8 can be located above a position between the targets 6 and 7, so as to receive the sputtering of the metal and the insulator simultaneously.

One or more metals such as aluminum (Al), chrome (Cr), manganese (Mn), iron (Fe), cobalt (Co), nickel (Ni), copper (Cu), zinc (Zn), gallium (Ga), palladium (Pd), silver (Ag), indium (In), tin (Sn), platinum (Pt), and lead (Pb) may be used, instead of Au, so as to obtain a distortion resistance layer with conductive particles having a diameter of 1 to 50 nm dispersed therein.

Alternatively, each of the conductive particles may be covered with a thin insulating layer (thickness: 5 nm or less). For example, each of the Al particles may be covered with an $Al_xO_y$ layer having a thickness of 1 nm, so as to obtain a distortion resistance layer allowing a tunnel current to flow therethrough. In this case, the particles can be in contact with each other via the thin $Al_xO_y$ layer. The tunnel current flows through the thin $Al_xO_y$ layers. Such a thin insulating layer covering each of the conductive particles, for example the $Al_xO_y$ layer, may be formed by heat treatment performed after the dispersion of the conductive particles in the electrically insulating substance layer. The heat treatment allows each of the conductive particles to react with the electrically insulating substance, forming a thin insulating film covering the conductive particle. Then, the conductive particle will not react with the electrically insulating substance, and thus stable characteristics with reduced change with time can be obtained.

In Example 1, $SiO_2$ was used as the electrically insulating substance. Materials such as silicon nitride ($Si_3N_4$), aluminum oxide ($Al_2O_3$), aluminum nitride (AlN), titanium oxide ($TiO_2$), and hafnium oxide ($HfO_2$) may also be used in place of $SiO_2$, so as to produce a distortion resistance layer with excellent corrosion resistance. These electrically insulating substances can be produced by sputtering the oxide and the nitride. They can also be produced by sputtering a semiconductor material such as silicon and aluminum and a metal material in an atmosphere containing oxygen and nitrogen.

When an oxide is used as the electrically insulating substance, the conductive particles are preferably made of at least one metal selected form the group consisting of Au, Ag, Cu, Pt, and Pd. With this combination, an extraordinarily stable resultant element can be produced. The reason is that the interface between the above metals and the oxide is sharp and stable.

As an alternative structure of the distortion resistance element, at least a pair of electrodes may be first formed on the electrical insulating substrate before the formation of the above-described distortion resistance layer. This ensures stable electrical connection between the electrodes and the conductive particles, and a resultant element of which characteristics and quality can be maintained for a long period of time is obtained. The distortion resistance layer may be further covered with another electrically insulating substance layer, whereby the stability is further increased and a quality degradation is prevented even in a corrosive atmosphere.

Silica glass was used as the substrate material. However, other materials such as a surface-polished stainless steel plate, a glass-coated iron plate, and a ceramic plate can also be used regardless whether or not they are conductive. When a material having a large thermal expansion coefficient, such as metal, is used for the substrate, the temperature-dependency of the resistance is large, because the distance between the conductive particles becomes large due to the thermal expansion of the substrate, increasing the resistance. This effect can be utilized to produce a high-sensitive temperature sensor.

In the distortion resistance layers made of the above materials, the hysteresis and the change with time of the distortion-resistance characteristics can be reduced by heat treatment. An appropriate temperature for the heat treatment was one-fifth to three-fifths of the melting point of the metal material used. It is considered that the above effects of the heat treatment are obtained because the diameter of the particles increases and is made uniform, as well as distortions and defects in the conductive particle crystals are removed. When a nitride material was used for the electrically insulating substance, the increase of the diameter of the particles was small, but the characteristics were stabilized. In this case, the diameter of the particles was controlled by adjusting the temperature of the substrate during the sputtering.

The particles were rounded by increasing the temperature of the substrate during the sputtering and by the heat treatment. The rounded particles showed more excellent initial characteristics than the particles having corners. This is presumably because the tunnel current tends to be affected by the surface condition of the particles. The rounded particles provide stable surfaces and permit a stable tunnel current to flow therebetween.

The electrically insulating substance layer having conductive particles dispersed therein may be formed by a sol-gel method, instead of sputtering. For example, hydrochloric acid is added to a mixture of a silicon alkoxide solution and a gold chloride acid aqueous solution. The resultant mixture is hydrolyzed, then applied to the substrate, and dried. Thereafter, the applied mixture is sintered at 700° to 800° C., so as to obtain a silica glass layer having gold particles dispersed therein.

Figure 7:
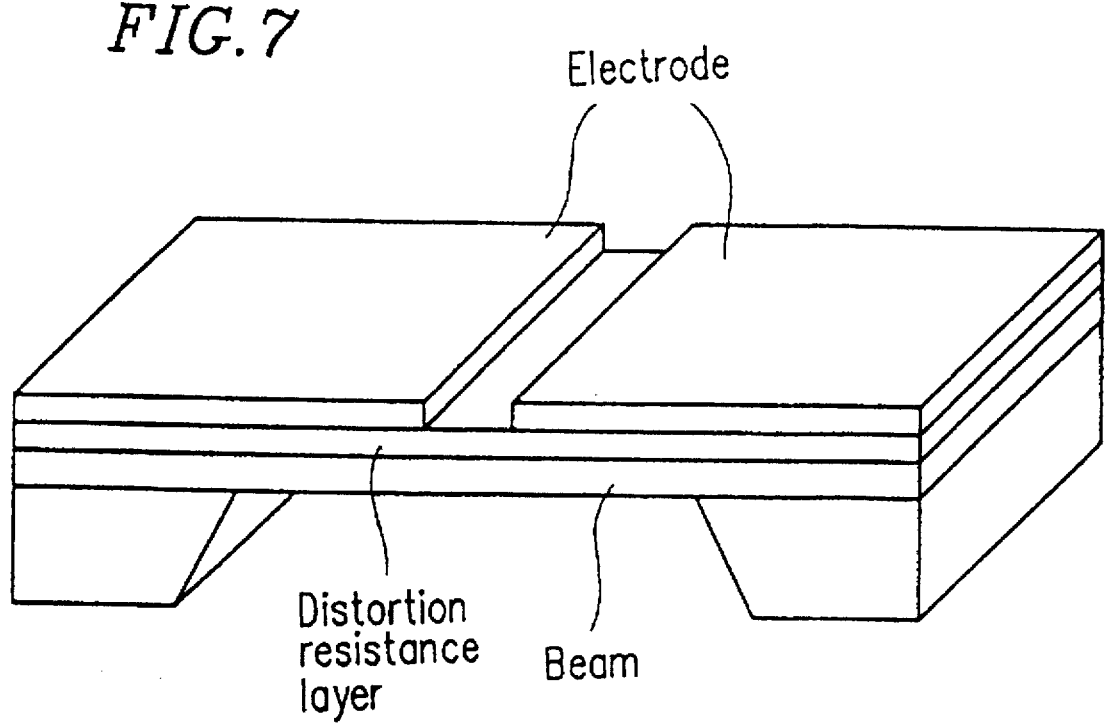
FIG. 7 is a perspective view of a structure having a distortion resistance layer on a beam base according to the present invention.

A variety of dynamic quantity sensors can be produced using the distortion resistance element obtained in this example. By using a beam as a base, a distortion due to deformation of the beam can be easily detected. FIG. 7 shows a sensor using a beam as a base. The sensor shown in FIG. 7 includes a beam, members supporting the both sides of the beam, a distortion resistance layer formed on the beam, and a pair of electrodes formed on the distortion resistance layer. When the beam deforms by receiving an outer force (for example, pressure and acceleration), a distortion arises in the distortion resistance layer. The distortion causes the distance between the conductive particles in the distortion resistance layer to change, and in turn causes the amount of the tunnel current to change depending on the change of the distance between the particles. The amount of the distortion can he determined by comparing the amount of the tunnel current with that of the tunnel current flowing through a reference distortion resistance layer not shown.

A cantilever may also be used as the base supporting the distortion resistance layer instead of the beam shown in FIG. 7.

(EXAMPLE 2)

In recent years, an interatomic force microscope has been developed for observing the surface of a solid at the level on the order of atoms. Such an interatomic force microscope includes a cantilever with a length of 100 to 200 μm provided with a probe to detect a minute force. A force received by an atom or a molecule at a surface of a sample when the tip of the probe comes into contact with the surface is detected by measuring the deflection of the cantilever by an optical lever method or an optical interference method. In general, the resolution of the interatomic force microscope increases as the size of the microscope is reduced. However, reducing the size of the microscope has not been successful because a detection mechanism such as an optical lever for detecting the deflection of the cantilever is required. Moreover, when the interatomic force microscope is used under a vacuum, elements such as a laser light source and a photodiode used in the optical lever method and the optical interference method are destroyed under a high-temperature environment. This prevents the baking temperature of a chamber from being raised to a high temperature, and thus it takes a long time to reach the ultra-high vacuum.

In order to overcome the above problems, there has been developed an interatomic force microscope which does not include a deflection detection mechanism formed outside. Instead, a silicon thin film, of which resistance is reduced by doping, is formed on the cantilever, and the change in the resistance of the thin film due to the deflection of the cantilever may be measured by use of the piezoresistance effect, so as to detect the deflection of the cantilever.

The above cantilever is also applied to an acceleration sensor used for cars, etc., en ultrasonic sensor, and the like. In these applications, the deflection of the cantilever may also be detected by use of a doped silicon thin film and a piezoelectric thin film (Japanese Laid-Open Patent Publication Nos. 4-164373 and 59-57595).

However, the deflection detection method using the piezoresistance effect of a semiconductor thin film made of silicon and the like has a problem: since the temperature-dependency of the thin film is large, the resultant sensor cannot be used under circumstances where the temperature varies greatly. The deflection detection method using a piezoelectric thin film also has another problem: although a dynamic deflection, such as an ultrasonic vibration, can be detected with high sensitivity, a static deflection cannot be detected.

By using the distortion resistance layer according to the present invention described in Example 1, a cantilever with excellent characteristics operable in interatomic force microscopes, acceleration sensors, ultrasonic sensors, and the like can be provided.

Hereinbelow, an example of the cantilever according to the present invention will be described.

Figure 8:
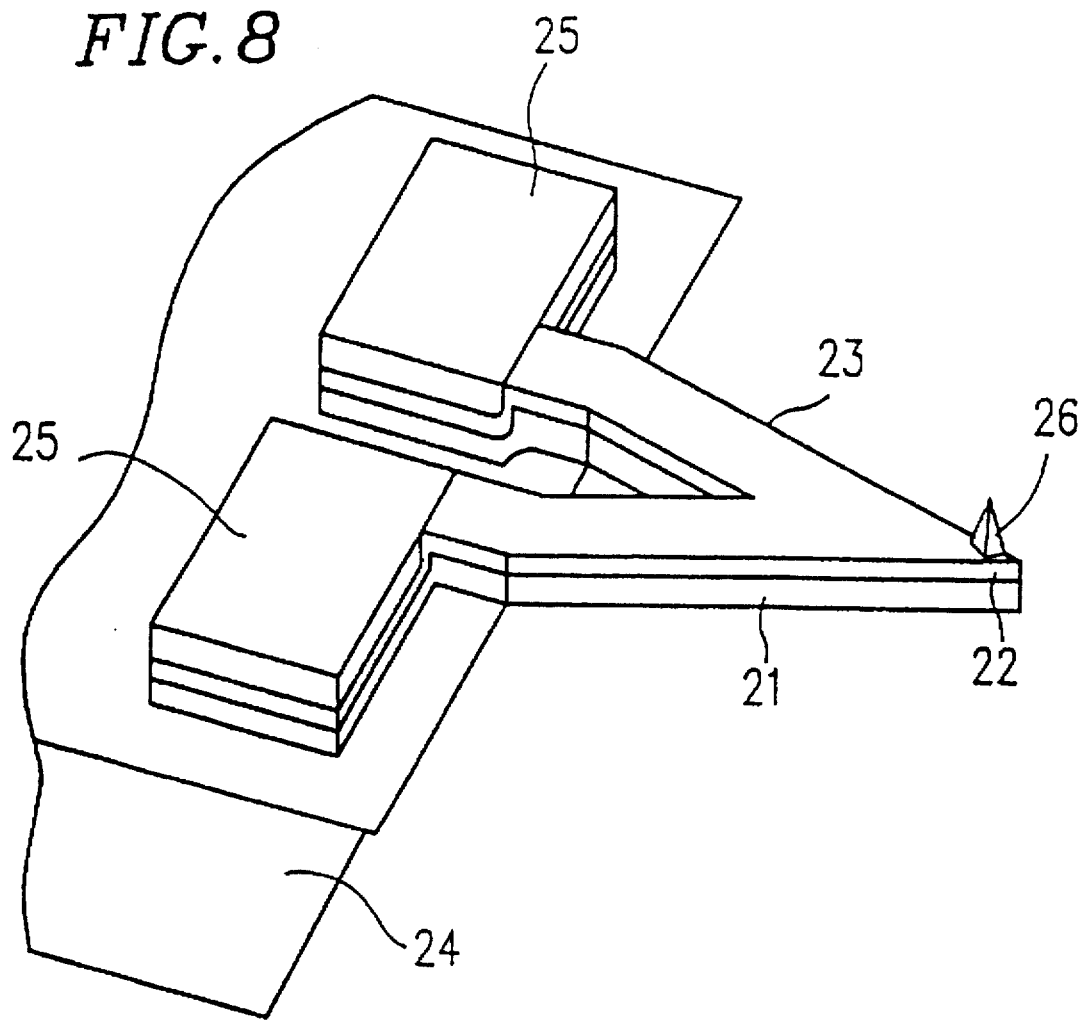
FIG. 8 is a schematic perspective view showing an example of the cantilever according to the present invention.

FIG. 8 schematically shows a perspective view of a cantilever 23 of this example. One end of the cantilever 23 composed of a thin film is secured to a glass substrate 24. A pair of electrodes 25 are formed on the end of the cantilever 23 secured to the glass substrate 24. The cantilever 23 has a multilayer structure including a 0.8 μm-thick $Si_3N_4$ thin film 21 and a distortion resistance layer 22 composed of a 0.1 μm-thick $SiO_2$ thin film having Au particles dispersed therein. The length of the thin film cantilever 23 is 100 μm. A probe 26 made of the same material as that of the cantilever 23 is provided at the top end of the cantilever 23.

A deflection of the cantilever 23 can be detected by measuring a change in the resistance between the pair of electrodes 25. The resistance changes depending on the distortion of the distortion resistance layer 22 caused by the deflection of the cantilever 23. The relationship between the distortion and the resistance is substantially the same as that shown in FIG. 6. As is apparent from FIG. 6, the change rate of the resistance (gauge factor) for a unit distortion is 15, indicating that the deflection can be measured with high sensitivity. It is also found that the resultant cantilever has an excellent temperature resistance characteristic of 10 ppm/°C. in the temperature range of −40° C. to 200° C. The amount of deflection can also be detected with high sensitivity by detecting a change in the capacitance due to the distortion.

The thin film cantilever 23 was installed in an interatomic force microscope. Deflection of the cantilever 23 arising at the moment when the probe 26 touched a surface of a sample was detected by measuring the resistance, and the surface of the sample was scanned while the position of the probe on the sample was controlled to obtain a fixed resistance. With this operation, the roughness of the surface of the sample was observed. This method of detecting deflection makes elements such as a laser light source and a photodiode unnecessary. Further, in the case of the interatomic force microscopy conducted under the ultra-high vacuum, it is possible to reach the ultra-high vacuum in a comparatively short period of time as the chamber can be easily baked. Moreover, since the cantilever of the present invention has superior temperature characteristics, interatomic force microscopy can be easily conducted at a low or high temperature.

Now, referring to FIG. 9A to 9E, the method for producing the cantilever 23 will be described.

Figure 9A:
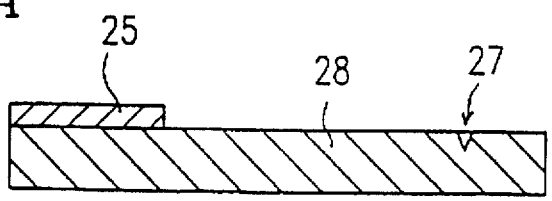
FIGS. 9A to 9E are sectional views showing steps of a method for producing the cantilever of FIG. 8.

First, as shown in FIG. 9A, an etch pit 27 was formed on an upper surface of a single-crystalline Si substrate 28 by anisotropy etching. The size of the etch pit 27 was about 5 μm×5 μm with a depth of about 3 μm, for example. Cr and Au were sequentially vapor-deposited on the Si substrate 28 in this order to the thicknesses of 50 nm and 500 nm, respectively, so as to cover the etch pit 27, and then etched by photolithography to form the pair of electrodes 25. The width of each of the electrodes 25 was 3 mm, and the distance between the electrodes 25 was 20 μm.

Figure 9B:
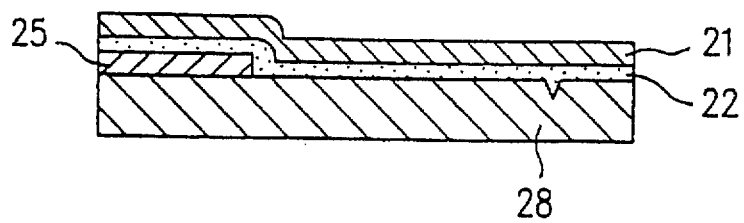

Thereafter, Au particles of an average diameter of 5 nm were deposited on the Si substrate 28, and subsequently SiO$_2$ was deposited to a thickness of 0.1 μm using the same sputtering apparatus by an alternate sputtering method, so as to form the distortion resistance layer 22. Then, as shown in FIG. 9B, Si$_3$N$_4$ was deposited on the thus-formed distortion resistance layer 22 to a thickness of 0.8 μm by CVD so as to form the Si$_3$N$_4$ thin film 21.

Figure 9C:
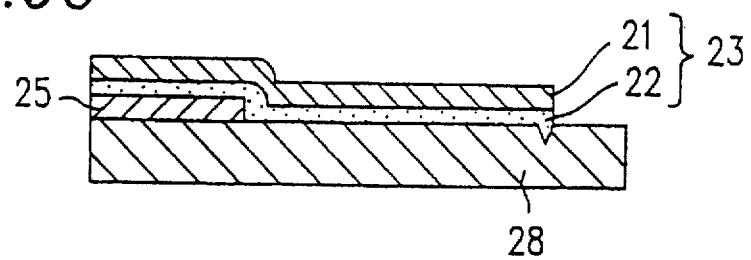
Figure 9D:
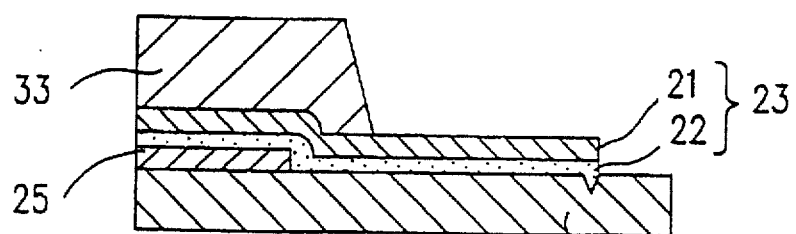
Figure 9E:
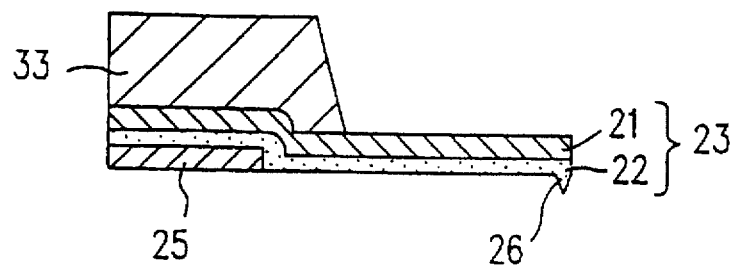

Then, as shown in FIG. 9C, the Si$_3$N$_4$ thin film 21 and the distortion resistance layer 22 were patterned to the shape of the cantilever 23 by photolithography. Thereafter, as shown in FIG. 9D, a portion of a glass substrate 33 was anodically bonded to fixed portions of the cantilever 23. The Si substrate 28 was then removed by etching, as shown in FIG. 9E, so as to complete the thin film cantilever 23. By forming the etch pit 27 on the surface of the Si substrate 28, the cantilever 23 is provided with the integrally-formed probe 26.

In Example 2, the cantilever for the interatomic force microscope was described. Cantilevers having the substantially the same structure can also detect acceleration and ultrasonic wave at high sensitivity. The probe is not required for the detection of acceleration and ultrasonic wave. However, the method for providing the cantilever with the probe described above (i.e., forming the etch pit on the Si substrate) can be employed to form a weight on a cantilever for an ultrasonic sensor. The weight can be used for adjusting the resonance frequency of the cantilever which is especially important for the ultrasonic sensor.

In Example 2, Au particles were used as the conductive particles. However, any conductive materials can also be used as the conductive particles. Especially, it is preferable to use materials which are thermally and chemically stable, such as precious metals. For example, at least one metal selected from the group consisting of aluminum (Al), chrome (Cr), manganese (Mn), iron (Fe), cobalt (Co), nickel (Ni), copper (Cu), zinc (Zn), gallium (Ga), palladium (Pd), silver (Ag), indium (In), tin (Sn), platinum (Pt), and lead (Pb) can be used. When the distance between the conductive particles is 5 nm or less, the change rate of the resistance depending on the deflection is large, improving the detection precision of deflection. The diameter of the conductive particles is preferably 1 to 50 nm from the standpoint of the production and in order to disperse the particles comparatively uniformly with the distance between the particles on the order of nanometers. Basically, it is important that the distance should be large enough for a tunnel current to flow therebetween. Naturally, all of the particles do not have to be apart from any adjacent particles by a distance to allow the tunnel current to flow therebetween. No problem arises if some particles are short-circuited with other particles. In short, it is enough to have a portion somewhere between the pair of electrodes where no current except for the tunnel current will flow therethrough. The volumetric occupation of the conductive particles in the portion of the electrically insulating substance layer where the current actually flows is preferably in the range of 15 to 70%. Within this range, a particularly sensitive distortion resistance element can be obtained.

Conductive particles having a diameter of 1 to 50 nm were also obtained by using at least one of Al, Cr, Mn, Fe, Co, Ni, Cu, Zn, Ga, Pd, Ag, In, Sn, Pt, and Pb in place of the Au particles.

Any materials with a conductivity low enough to detect a change in the tunnel current, such as oxides, nitrides, and organic materials, can be used as the electrical insulating materials.

When the conductive particles are covered with the electrically insulating substance, the electrodes should be formed so as to be in contact with the conductive particles by removing the electrically insulating substance covering the particles.

In Example 2, the distortion resistance layer 22 composed of the SiO$_2$ film with the Au particles dispersed therein was obtained by a one-time sputtering of Au and SiO$_2$. Alternatively, a distortion resistance layer made of an electrically insulating substance having layers of conductive particles with uniform diameters can be produced, for example, by sputtering Au and SiO$_2$ several times. At this time, each SiO$_2$ film is made thin. Thus, a cantilever capable of detecting the resistance with high precision can be produced. The distortion resistance layer can also be produced by sputtering the metal and the insulator simultaneously.

In Example 2, SiO$_2$ was used as the electrically insulating substance. Instead, a substance having as a main component at least one metal selected from the group consisting of oxides of silicon (Si), aluminum (Al), titanium (Ti), and hafnium (Hf) and nitrides of silicon (Si) and aluminum (Al) can be used. When Si$_3$N$_4$, Al$_2$O$_3$, AlN, TiO$_2$, and HfO$_2$ are used as the electrically insulating substance, a distortion resistance layer with excellent corrosion resistance can be obtained. These electrical insulating substances can be produced by sputtering the oxide and the nitride. They can also be produced by sputtering a semiconductor material such as Si and Al and a metal material in an atmosphere containing oxygen and nitrogen.

When an oxide or a nitride is used as the electrically insulating substance, the conductive particles is preferably made of at lease one metal selected form the group consisting of Au, Ag, Cu, Pt, and Pd. With this combination, the distortion resistance layer 22 with excellent stability can be produced. The reason is that the interface between the above metals and an oxide or a nitride is sharp and stable.

The pair of electrodes may also be formed so as to sandwich the distortion resistance layer. With this structure, a stable electrical connection between the electrodes and the conductive particles is ensured.

In Example 2, the electrically insulating substance layer was formed over the entire top surface of the cantilever. However, the electrically insulating substance layer may be formed on only the portion of the top surface of the cantilever where a deflection arises. The sensitivity increased by forming the electrically insulating substance layer near the fixed portion of the cantilever where the deflection is highest.

In the distortion resistance layers made of the above materials, the hysteresis and the change with time of the distortion-resistance characteristics can be reduced by heat treatment. An appropriate temperature for the heat treatment was one-fifth to three-fifths of the melting point of the metal material used. It is considered that the above effects of the heat treatment are obtained because the diameter of the particles increases and is made uniform, as well as distortions and defects in the conductive particle crystals are removed. When a nitride material was used for the electrically insulating substance, the increase of the diameter of the particles was small, but the characteristics were stabilized. In this case, the diameter of the particles is controlled by the temperature of the substrate during the sputtering.

The beam for the cantilever, i.e., the Si$_3$N$_4$ thin film was formed after the formation of the distortion resistance layer composed of the electrically insulating substance having the conductive particles dispersed therein. However, the distortion resistance layer may be formed on the beam by sputtering and the like after the formation of the beam.

(EXAMPLE 3)

Conventionally, a mechanical gyroscope has been used as an inertial navigation apparatus for airplanes, vessels, and the like. The gyroscope is highly precise, but large and expensive. Accordingly, for home electric appliances and cars, vibration-type angular velocity sensors of a tuning fork shape and a triangle pole shape are used.

A conventional vibration-type angular velocity sensor is described in Japanese Laid-Open Patent Publication No. 5-264282, which is of the tuning fork shape where a vibration unit composed of a driving element and a detection element coupled to cross each other at right angles is coupled to a unit composed of a monitor element and another detection element via a coupling block.

When a voltage is applied to the driving element to cause a vibration, the monitor element vibrates via the coupling block and the entire tuning fork structure resonates. The driving voltage is controlled by monitoring the amplitude and phase of the vibration of the monitor element so as to stabilize the driving vibration. when an angular velocity ω is generated in the sensor axis direction, a Corioli's force Fc arises in a direction vertical to directions of the vibration of the detection elements. Because the pair of detection elements vibrate in reverse directions with respect to each other, they deform in reverse directions by the Corioli's force, causing electric charges to be generated on the surfaces due to the piezoelectric effect. The angular velocity can be detected by measuring the electric charges.

In the conventional sensors, however, the resonance frequency is deviated or the attenuation characteristic varies unless piezoelectric elements for driving, monitoring, and detection are processed and assembled with high precision. Accordingly, the angular velocity cannot be detected at high sensitivity. Further, since the sensor is formed by assembling a plurality of components, it is difficult to reduce the size and the cost of the resultant sensor.

Figure 10:
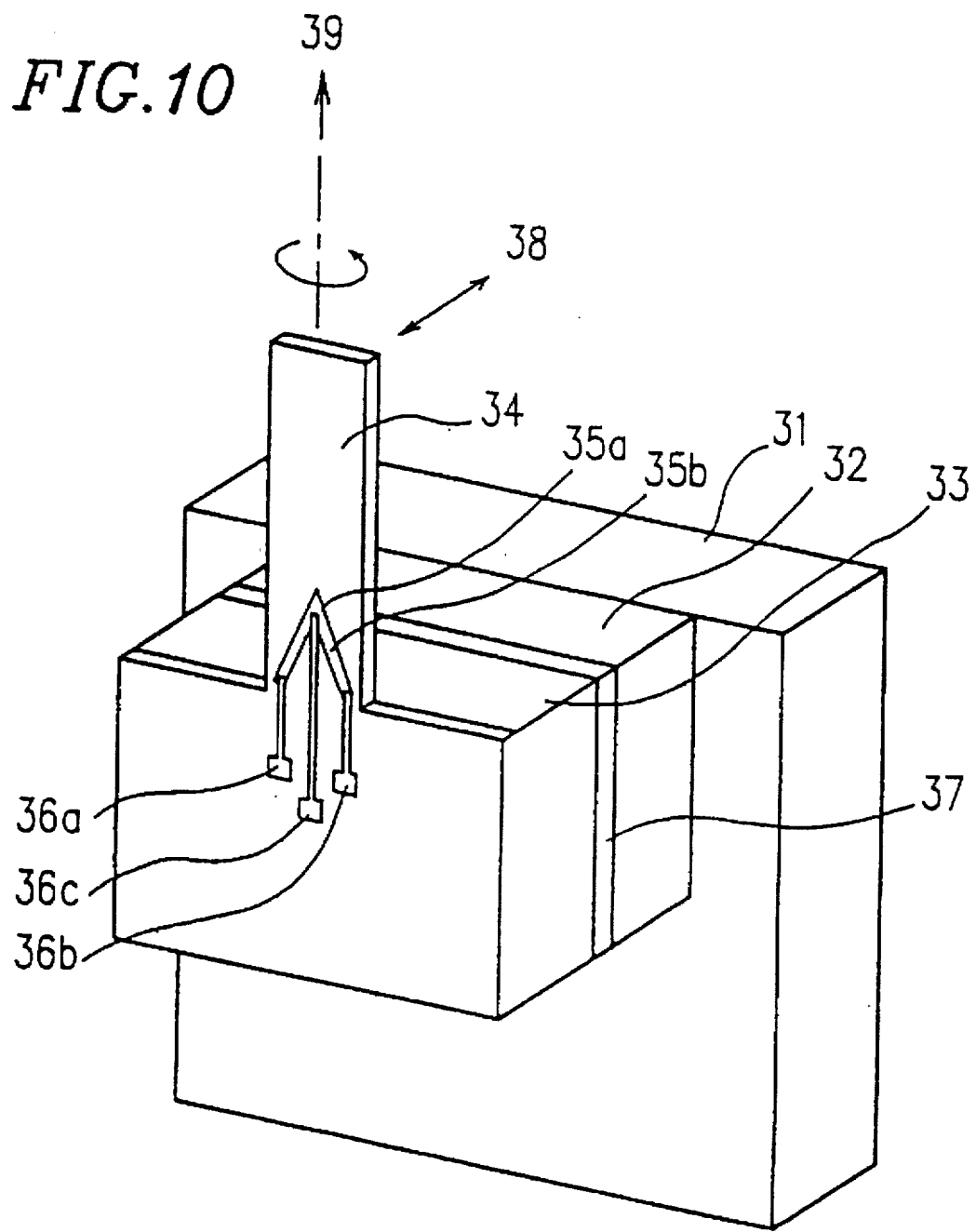
FIG. 10 is a perspective view of a detection portion of an example of the angular velocity sensor according to the present invention.

FIG. 10 is a perspective view of an example of the angular velocity sensor according to the present invention.

Referring to FIG. 10, the angular velocity sensor of the present invention includes a fixed portion 33, a cantilever 34 which extends in a direction 39 from the fixed portion 33, a piezoelectric driving element 32 for vibrating the cantilever 34, and a substrate 31 for supporting these components. The cantilever 34 is made of silicon oxide and has a size of 250 μm in length, 25 μm in width and 5 μm in thickness. The resonance frequency of the cantilever 34 is 60 kHz. The cantilever 34 and the fixed portion 33 can be easily produced from a silicon wafer having an oxide film formed thereon by a semiconductor process technique. The fixed portion 33 is adhered to an electrode 37 of the piezoelectric driving element 32 by an adhesive.

The substrate 31 may be made of various materials such as glass, metal, and resins according to the usage of the resultant sensor. The substrate 31 may be used as an electrode opposite to the electrode 37 of the piezoelectric driving element 32 by using a conductive material such as metal.

Distortion resistance elements 35a and 35b are formed on the cantilever 34. The distortion resistance element of the present invention described in Example 1 is used as the distortion resistance elements 35a and 35b. The distortion resistance elements 35a and 35b are formed by forming a 1-μm thick distortion resistance layer composed of silicon oxide having gold particles dispersed therein by sputtering gold and silicon oxide alternately and etching the distortion resistance layer to have the shape shown in FIG. 10. The above process may be conducted before the formation of the cantilever 34. In such a case, a silicon oxide film is first formed on a surface of the silicon wafer, and the distortion resistance layer is formed on the silicon oxide film. Then, the distortion resistance layer is patterned so as to have the shape of the distortion resistance elements shown in FIG. 10 on the area of the silicon oxide film which is to become the cantilever 34.

In this example, the distortion resistance elements were arranged so as to extend in a direction about 30° inclined from the direction 39 (length direction) of the cantilever 34. The inclination is not limited to 30°, but any angle is acceptable as far as the distortion resistance elements 35a and 35b extend in directions which are not parallel to the direction 39. The size of the distortion resistance elements 35a and 35b is 10 to 100 μm in length and 3 to 10 μm in width.

According to the angular velocity sensor shown in FIG. 10, when a torsion stress is generated around the axis of the direction 39, one of the distortion resistance elements 35a and 35b expands and the other contracts. The distortion resistance elements 35a and 35b are electrically connected with a drawing electrode 36c made of a metal thin film at the ends thereof nearer to the free end of the cantilever 34, and are connected with drawing electrodes 36a and 36b made of metal thin films, respectively, at the fixed ends thereof. These drawing electrodes 36a, 36b, and 36c can be formed of metal such as gold before or after the formation of the distortion resistance elements 35a and 35b. As the distortion resistance elements 35a and 35b, it is especially preferable to use the distortion resistance element of Example 1 composed of the electrically insulating substance layer having a plurality of conductive particles dispersed therein to obtain high sensitivity.

Figure 11:
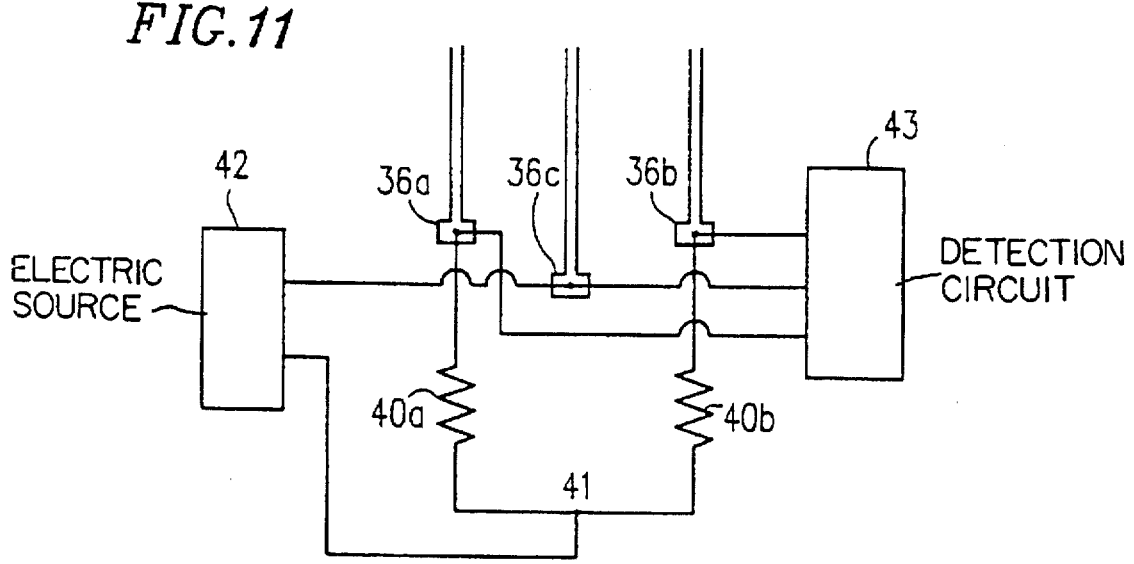
FIG. 11 is an equivalent circuit diagram of a coupling portion between a detection portion of the angular velocity sensor of FIG. 10 and a detection circuit according to the present invention.

FIG. 11 is a circuit diagram showing the connections between the drawing electrodes 36a, 36b, and 36c for the distortion resistance elements 35a and 35b and a detection circuit 43.

Wheatstone bridges are formed between the distortion resistance elements 35a and 35b and resistance elements 40a and 40b which have substantially the same resistances as those of the distortion resistance elements 35a and 35b. Each of the resistance elements 40a and 40b may be a distortion resistance element and can be formed on the surface oxide film of the fixed portion 33 simultaneously with the formation of the distortion resistance elements 35a and 35b. Since the fixed portion 33 does not receive a bending stress, the resistance of the resistance elements 40a and 40b does not change even when the cantilever 34 is vibrated. By using the same material for the resistance elements 40a and 40b and the distortion resistance elements 35a and 35b, the changes in the resistance depending on the temperature for these elements are compensated. Accordingly, an angular velocity sensor with excellent temperature characteristics can be produced. An electric source 42 applies a voltage between the drawing electrode 36c and an electrode 41. The detection circuit 43 amplifies and detects the voltage between the electrodes 36a and 36b.

The operation of the angular velocity sensor with the above structure will be described.

An alternate current voltage is applied to the piezoelectric driving element 32 to vibrate the cantilever 34 in a direction 38 vertical to the main plane of the cantilever 34. The resistances of the distortion resistance elements 35a and 35b repeatedly increase and decrease according to the vibration, but no difference arises between the two resistances, thus generating little voltage between the electrodes 36a and 36b. However, when a rotation around the axis of the direction 39 is applied, an angular velocity vector is directed to the length direction 39 of the cantilever 34. This causes the generation of Corioli's force in a direction vertical to the rotation axis (direction 39) and the vibration direction (direction 38), deviating the direction of the vibration of the cantilever 34. As a result, a torsion stress is generated in the cantilever 34, and an expansion stress is applied to one of the distortion resistance elements 35a and 35b while a contraction stress is applied to the other. This produces a difference in the resistance between the distortion resistance elements 35a and 35b, and generates a voltage between the distortion resistance elements 35a and 35b. This voltage is amplified and detected by the detection circuit 43 so as to measure the angular velocity. The voltage is also used to detect the direction of the rotation because the polarity of the voltage is inverted depending on the direction of the rotation.

The amplitude of the vibration of the cantilever 34 in the direction 38 can be detected by monitoring the change in the resistance of either of the distortion resistance elements 35a and 35b. More specifically, the amplitude can be kept uniform by detecting the amplitude, by monitoring the voltage between the electrode 36a and the node (electrode) 41 by the detection circuit 43, and controlling the piezoelectric driving element 32 by the feedback of the detected signal. For the above monitoring, a third distortion resistance element may also be provided along the length of the cantilever 34 to be exclusively used for the detection of the amplitude of the vibration of the cantilever 34.

It is also possible to incorporate in a silicon substrate of the fixed portion 33 a circuit for the piezoelectric driving element 32, a circuit for amplifying and detecting a voltage generated between the electrodes 36a and 36b, a circuit for monitoring the amplitude of the vibration of the cantilever, a circuit for the feedback control of the piezoelectric driving element 32, and a resistor for the bridge circuit. This eliminates the necessity of producing a circuit portion separately from the sensor portion and connecting these portions with wirings. This greatly reduces the size of the resultant sensor.

Figure 12:
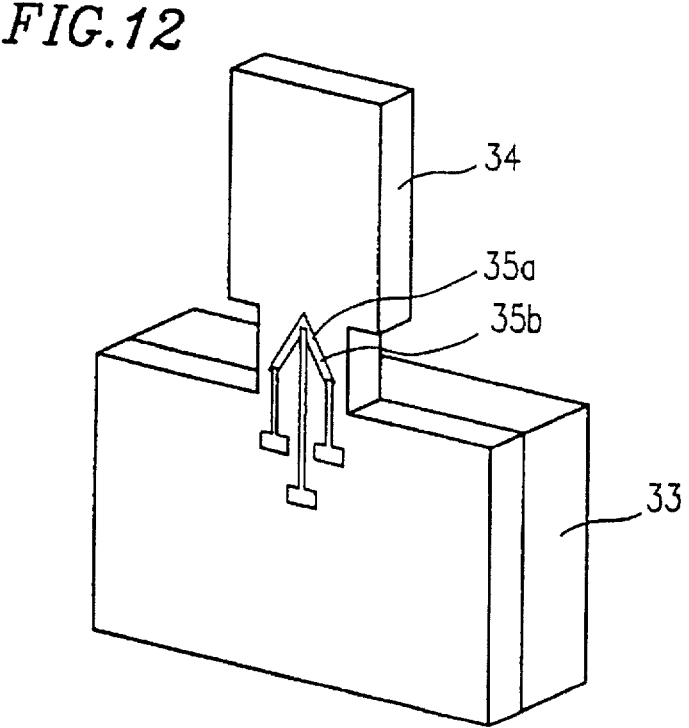
FIG. 12 is a perspective view of a detection portion of another angular velocity sensor according to the present invention.

In the above example, the rectangular cantilever as shown in FIG. 10 was used. Alternatively, a cantilever as shown in FIG. 12 may also be used. In this cantilever, the portion thereof where the distortion resistance elements are formed is narrowed. This shape reduces the response speed, but the sensitivity increases because the torsion stress which acts in the direction 39 can be concentrated in this narrowed portion. The same effect is also obtained by thinning the portion of the cantilever where the distortion resistance elements are formed.

The thin film resistance element composed of an insulator having conductive particles dispersed therein was used as the distortion resistance elements. Alternatively, a semiconductor diffusion resistance element using a semiconductor such as silicon doped with impurities, a thin film metal resistance element, and a thin film semiconductor resistance element using germanium, amorphous silicon, and the like can also be used.

When the semiconductor diffusion resistance element is used, the cantilever is made of the same semiconductor. By implanting impurities in the surface region of the cantilever made of the semiconductor, the distortion resistance elements can be easily formed on the surface of the cantilever. The resultant sensor is superior in the sensitivity, but inferior in the temperature characteristics. The thin film metal resistance element is superior in the temperature characteristics, but inferior in the sensitivity. The semiconductor thin film resistance element exhibits intermediate characteristics between those of the former two. Totally, the thin film resistance element composed of an insulator having conductive particles dispersed therein is best, which is superior both in temperature characteristics and sensitivity and can be easily produced. Thus, a sensor with high stability can be produced with good reproducibility. As for the conductive particles, precious metals such as gold, platinum, silver, and copper exhibit particularly excellent characteristics.

The silicon oxide film was used as the cantilever in this example. Alternatively, a cantilever made of silicon produced from a silicon wafer by micromachining and a cantilever made of silicon nitride can also be used. The silicon cantilever is advantageous in that the distortion resistance elements can be integrally formed by the implantation of boron ions and the like in the surface region of the cantilever. The silicon nitride cantilever can produce a sensor which has a large breaking strength and a high shock resistance. The silicon oxide cantilever of this example can produce a sensor which has a small thermal expansion coefficient and is superior in the thermal resistance and the temperature characteristics. In particular, a sensor composed of the silicon oxide cantilever and the distortion resistance elements composed of the silicon oxide thin film having conductive particles dispersed therein is excellent in the thermal resistance and the temperature characteristics, and thus is most suitable for angular velocity sensors for vehicles which require long-term reliability.

Thus, according to the dynamic quantity sensor of the present invention, the dynamic quantity such as a distortion is detected by measuring a tunnel current flowing through small gaps between the conductive particles. Accordingly, the sensitivity of the sensor to the dynamic quantity is high, and the temperature-dependency of the distortion is reduced. Further, since metal materials and electrical insulating materials which have excellent corrosion resistance can be used, the resultant dynamic quantity sensor is excellent in reliability and long-term stability. The dynamic quantity sensor may be processed into a shape of a cantilever or attached to a flexible resin substrate to be used as an acceleration sensor, a shook sensor, a pressure sensor, and the like. It can also be used as a temperature sensor by disposing it on the portion of a large substrate having a large thermal expansion coefficient where no distortion is generated.

According to the method for producing the dynamic quantity sensor of the present invention, the type of metal used, the size of the conductive particles, the density of the conductive particles in the distortion resistance layer, and the distance between the conductive particles can be easily controlled, and a sensor having a distortion resistance layer with excellent characteristics can be produced with good reproducibility.

The distortion resistance layer composed of the electrically insulating substance layer having the conductive particles dispersed therein can be formed on a beam base such as a cantilever. Then, a deflection of the beam can be measured by detecting a tunnel current flowing through small gaps between the conductive particles. Thus, a cantilever having a deflection measuring portion which can detect a deflection of the cantilever with high sensitivity, has excellent temperature characteristics, and operates stably for a long period of time can be realized.

According to the angular velocity sensor of the present invention, a semiconductor process technique which permits a high-precision processing can be used. Accordingly, a high-sensitive and small-size angular velocity sensor can be produced at low cost. Further, since the cantilever includes a semiconductor substrate made of silicon and the like, a circuit for amplifying and detecting a minute change in the resistance of the distortion resistance element, a circuit for monitoring the amplitude of the vibration of the cantilever, and the like can be incorporated in the fixed portion of the sensor. This further reduces the size and weight of the resultant sensor.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A dynamic quantity sensor comprising an electrically insulating substance layer and at least one pair of electrodes contacting the electrically insulating substance layer,
    wherein a plurality of conductive particles are dispersed in the electrically insulating substance layer so that a tunnel current flows when a voltage is applied between the at least one pair of electrodes, and a dynamic quantity relating to a distance between the conductive particles is detected based on the tunnel current.

2. A dynamic quantity sensor according to claim 1, further comprising a base for supporting the electrically insulating substance layer.

3. A dynamic quantity sensor according to claim 2, wherein the base is a flat substrate.

4. A dynamic quantity sensor according to claim 2, wherein the base is a beam in which both ends are fixed.

5. A dynamic quantity sensor according to claim 2, wherein the base is a cantilever in which one end is fixed.

6. A dynamic quantity sensor according to claim 1, wherein the diameter of the conductive particles is in the range of 1 to 50 nm.

7. A dynamic quantity sensor according to claim 1, wherein the conductive particles are dispersed in layers in the electrically insulating substance layer.

8. A dynamic quantity sensor according to claim 1, wherein the distance between the conductive particles is 5 nm or less.

9. A dynamic quantity sensor according to claim 1, wherein the conductive particles comprise at least one metal selected from the group consisting of aluminum (Al), chrome (Cr), manganese (Mn), iron (Fe), cobalt (Co), nickel (Ni), copper (Cu), zinc (Zn), gallium (Ga), palladium (Pd), silver (Ag), indium (In), tin (Sn), platinum (Pt), gold (Au), and lead (Pb).

10. A dynamic quantity sensor according to claim 1, wherein the electrically insulating substance layer is made of an oxide, and the conductive particles are made of at least one metal selected from the group consisting of gold (Au), silver (Ag), copper (Cu), platinum (Pt), and palladium (Pd).

11. A dynamic quantity sensor according to claim 1, wherein the electrically insulating substance layer comprises at least one material selected from the group consisting of oxides of silicon (Si), aluminum (Al), titanium (Ti), and hafnium (Hf) and nitrides of silicon (Si) and aluminum (Al).

12. A distortion resistance element comprising an electrically insulating substance layer and at least one pair of electrodes contacting the electrically insulating substance layer, for detecting a distortion arising in the electrically insulating substance layer based on a current flowing between the pair of electrodes,
    wherein a plurality of conductive particles are dispersed in the electrically insulating substance layer so that a tunnel current flows when a voltage is applied to the at least one pair of electrodes.

13. A distortion resistance element according to claim 12, wherein the diameter of the conductive particles is in the range of 1 to 50 nm.

14. A distortion resistance element according to claim 12, wherein the conductive particles are dispersed in layers in the electrically insulating substance layer.

15. A distortion resistance element according to claim 12, wherein the distance between the conductive particles is 5 nm or less.

16. A distortion resistance element according to claim 12, wherein the conductive particles comprise at least one metal selected from the group consisting of aluminum (Al), chrome (Cr), manganese (Mn), iron (Fe), cobalt (Co), nickel (Ni), copper (Cu), zinc (Zn), gallium (Ga), palladium (Pd), silver (Ag), indium (In), tin (Sn), platinum (Pt), gold (Au), and lead (Pb).

17. A distortion resistance element according to claim 12, wherein the electrically insulating substance layer is made of an oxide, and the conductive particles comprise at least one metal selected from the group consisting of gold (Au), silver (Ag), copper (Cu), platinum (Pt), and palladium (Pd).

18. A distortion resistance element according to claim 12, wherein the electrically insulating substance layer comprises at least one material selected from the group consisting of oxides of silicon (Si), aluminum (Al), titanium (Ti), and hafnium (Hf) and nitrides of silicon (Si) and aluminum (Al).

19. A distortion resistance element according to claim 12, where the electrically insulating substance layer and the pair of electrodes are formed as a plurality of stacked layers.

* * * * *